(12) United States Patent
Bletsos et al.

(10) Patent No.: US 8,415,262 B2
(45) Date of Patent: Apr. 9, 2013

(54) POROUS FIBROUS SHEETS OF NANOFIBERS

(75) Inventors: Ioannis V. Bletsos, Midlothian, VA (US); Joseph Robert Guckert, Chester, VA (US); Mikhail R. Levit, Richmond, VA (US); David Carl Roberts, Colonial Heights, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1227 days.

(21) Appl. No.: 10/971,382

(22) Filed: Oct. 22, 2004

(65) Prior Publication Data

US 2005/0142973 A1 Jun. 30, 2005

Related U.S. Application Data

(60) Provisional application No. 60/513,472, filed on Oct. 22, 2003.

(51) Int. Cl.
*D04H 1/00* (2006.01)

(52) U.S. Cl.
USPC ........... 442/341; 442/344; 442/345; 442/346; 442/385; 442/412; 442/413

(58) Field of Classification Search .................. 442/341, 442/344, 345, 346, 385, 412, 413
See application file for complete search history.

(56) References Cited

U.S. PATENT DOCUMENTS

| | | | |
|---|---|---|---|
| 5,308,691 A | 5/1994 | Lim et al. | |
| 5,709,735 A * | 1/1998 | Midkiff et al. | ........... 428/311.11 |
| 5,759,926 A | 6/1998 | Pike et al. | |
| 6,624,100 B1 | 9/2003 | Pike | |
| 2002/0035354 A1 * | 3/2002 | Mirle et al. | ............. 604/385.01 |
| 2002/0168508 A1 | 11/2002 | Reed et al. | |
| 2003/0129909 A1 | 7/2003 | Zucker | |
| 2003/0141261 A1 | 7/2003 | Koslow | |
| 2003/0165740 A1 | 9/2003 | Edwards et al. | |
| 2003/0168401 A1 | 9/2003 | Koslow | |
| 2003/0177909 A1 | 9/2003 | Koslow | |
| 2004/0116028 A1 | 6/2004 | Bryner | |
| 2004/0128732 A1 | 7/2004 | Zucker et al. | |
| 2004/0266300 A1 | 12/2004 | Isele et al. | |

FOREIGN PATENT DOCUMENTS

| | | | |
|---|---|---|---|
| GB | 1263477 | * | 9/1972 |
| JP | 58150411 A | * | 9/1983 |
| JP | 1104867 A | | 4/1989 |
| JP | 0333252 A | | 2/1991 |
| JP | 3134964 B2 | | 2/1994 |
| JP | 1994280153 A | | 10/1994 |
| JP | 7068686 A | | 3/1995 |
| JP | 1995068687 A | | 3/1995 |
| JP | 1995119074 A | | 5/1995 |
| JP | 2003306861 A | | 10/2003 |
| WO | WO 02/42164 A2 | | 5/2002 |
| WO | WO 02/42164 A3 | | 5/2002 |
| WO | WO 03/064013 A1 | | 8/2003 |
| WO | WO 03/080905 A1 | | 10/2003 |
| WO | WO 2004/016852 A2 | | 2/2004 |
| WO | WO 2004/016852 A3 | | 2/2004 |

OTHER PUBLICATIONS

Woodings, Calvin, "Regenerated Cellulose Fibers, A brief history of Regenerated Cellulose Fibers", 2001, p. 1-21.*

* cited by examiner

*Primary Examiner* — Elizabeth Cole

(57) ABSTRACT

Porous fibrous sheets are provided that are useful in end uses requiring microbial barrier properties such as medical packaging and medical gowns and drapes. The porous fibrous sheets may contain nanofibers and wood pulp.

6 Claims, No Drawings

POROUS FIBROUS SHEETS OF NANOFIBERS

BACKGROUND OF THE INVENTION

1. Field of the Invention

This invention relates to porous fibrous sheets, such as papers and nonwoven fabrics, which comprise nanofibers or a combination of wood pulp and nanofibers.

2. Description of the Related Art

Barrier to microbial penetration is an important and essential property of materials used for packaging medical devices. Materials currently used in medical packaging include a variety of films, flash-spun polyolefin nonwovens, and medical grade papers. In cases where gas or plasma sterilization (e.g., ethylene oxide, Sterrad®, etc.) is used to sterilize the contents of a package, the package generally includes a film, such as a thermoformed film, forming the bottom web that is heat-sealed to a porous and gas permeable lid, such as paper or flash-spun polyolefin sheet. Alternately, the package may be in the form of a pouch comprising a porous layer heat-sealed to a film. The porous lid or layer must allow the sterilant gas or plasma to enter and exit the package to sterilize its contents and at the same time provide a barrier to microbial penetration in order for the medical device to remain sterile until it is used.

The microbial barrier properties of a porous fibrous sheet depend on the average pore size, sheet thickness, size of fibers, fiber morphology, etc. Porous microbial barrier sheets prevent penetration by microbial spores and particles that range in size from sub-micrometer to a few micrometers. The ability of porous sheets to prevent bacterial penetration is measured by their Log Reduction Value (LRV). The higher the LRV value, the better a material is in preventing microbial penetration of the package. For example, the LRV of flash-spun polyolefin sheets used in medical packaging ranges between about 3.2 and 5.5 or higher, as the basis weight (BW) increases from about 1.65 to 2.2 oz/yd$^2$ (55.9 to 74.6 g/m$^2$). Medical grade papers known in the art have LRV's between about 1 and 3, depending on their basis weight, pore size, additive treatments, etc., and are much less effective as microbial barriers than flash-spun materials. Although paper has been improved through many years of use in medical packaging, it still has further limitations in strength, tear resistance and also peelability. Special peelable coatings are used such that they form the weak link in heat sealed packages and tend to fail cohesively when packages are peeled to avoid tearing the paper, which results in linting of the medical device.

Koslow, Patent Application Publication No. U.S. 2003/0177909 describes an air filter medium comprising nanofibers. A coating of nanofibers can be used to enhance the performance of filter media. The nanofibers are preferably fibrillated nanofibers. In one embodiment a filter medium is prepared from a blend of fibrillated nanofibers and glass microfibers.

Generally, increasing the basis weight can increase the barrier properties of nonwoven webs. It would be desirable to improve the barrier properties in a cost-effective manner without increasing basis weight or changing the nonwoven properties that control their porosity and breathability. There remains a need for porous fibrous sheet structures having improved microbial barrier properties for use in medical packaging.

SUMMARY OF THE INVENTION

One embodiment of this invention is a porous fibrous sheet for medical packaging comprising nanofibers having a diameter in the range of about 10 nm to about 1000 nm.

One embodiment of this invention is a porous fibrous sheet comprising between about 1 weight percent and 99 weight percent nanofibers and between about 99 and 1 weight percent wood pulp, based on the total combined weight of nanofibers and wood pulp in the fibrous sheet having an LRV of at least 1.

DETAILED DESCRIPTION OF THE INVENTION

The present invention is directed to porous fibrous sheets, including papers and nonwoven fabrics that comprise nanofibers or a nanofiber/wood pulp combination. The fibrous sheets have improved barrier properties at substantially the same basis weight as similar fibrous sheets that do not contain nanofibers. Certain porous fibrous sheets of the present invention are useful as microbial barrier materials, for example in lidding for medical packaging.

The term "nanofiber" as used herein refers to fibers having a diameter or cross-section between about 10 nanometers (nm) and 1000 nm (1 micrometer), preferably between about 200 and 400 nm and more preferably less than 200 nm. The term diameter as used herein will include the greatest cross-section of non-round shapes.

The term "lyocell fibers" as used herein refers to fibers that are formed by spinning of a solution that is obtained by dissolving wood pulp in an organic solvent, such as an amine oxide. Methods for manufacture of lyocell fibers are known in the art. "Wood pulp" as used herein refers to the product of boiling wood chips with alkaline liquors or solutions of acidic or neutral salts followed by bleaching with chlorine compounds, the object being to remove more or less completely the hemicelluloses and lignin incrustants of the wood.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. The term "polyester" as used herein also includes copolymers (such as block, graft, random, and alternating copolymers), blends, and modifications thereof. Examples of polyesters include poly(ethylene terephthalate) (PET), which is a condensation product of ethylene glycol and terephthalic acid, and poly(1,3-propylene terephthalate), which is a condensation product of 1,3-propanediol and terephthalic acid.

The terms "nonwoven fabric, sheet, layer, or web" as used herein means a structure of individual fibers, filaments, or threads that are positioned in a random manner to form a planar material without an identifiable pattern, as opposed to a knitted or woven fabric. Examples of nonwoven fabrics include meltblown webs, spunbond webs, carded webs, air-laid webs, wet-laid webs, spunlaced webs, and composite webs comprising more than one nonwoven layer.

Nanofibers suitable for use in the present invention include organic or inorganic nanofibers including, but not limited to, nanofibers made from polymers, engineered resins, ceramics, cellulose, rayon, glass, metal, activated alumina, carbon or activated carbon, silica, zeolites, or combinations thereof.

The nanofibers are preferably fibrillated nanofibers, such as those described in Koslow, Patent Application Publication No. U.S. 2003/0177909, which is hereby incorporated by reference. Fibers that can be fibrillated to form nanofibers include lyocell fibers and select grades of acrylic, nylon, or other synthetic fibers of incomplete crystallinity. Fibrillation is the peeling back or splintering of the fiber ends to form tiny "hairs" on the surface of the fiber. If the fiber is likened to a banana, small fibrils or sections of the fiber splinter and pull away like a banana peel. Fibrillated nanofibers can be prepared by subjecting fibrillatable fibers, such as chopped fiber tow, having a length between about 1 and 10 mm to repetitive stresses while minimizing further reduction in fiber length. The preferred weight weighted mean length for fibrillated nanofibers should be less than about 4 mm. For example, the fibers can be fibrillated in water in a device such as a blender, or in beater or refiner machines known in the art.

As the fibers undergo these stresses, the fibers form fibrils ("hairs") as a result of weaknesses between amorphous and crystalline regions to form nanofibers. Samples of the resulting fibrillated pulp can be removed from the fibrillating process at intervals and analyzed to determine when the desired fiber diameter, generally between 10 nm and 1000 nm, is achieved. Samples of fibrillated nanofibers (after drying) can be mounted on appropriate holders and inserted in a Scanning Electron Microscope (SEM). Fiber dimensions can be measured individually and averaged per unit area from micrographs that are obtained at various magnifications to account for differences in length and diameter.

Nanofibers can be used in either dry form or in the form of water slurry to make a porous fibrous sheet according to the present invention. Also, wood pulp can be added to the nanofibers described above. When using nanofibers in dry form, dry-laid methods known in the art can be applied to produce the porous fibrous sheets of this invention. These methods include, but are not limited to, air-laid technology and spunlace technology. When using nanofibers in the form of a slurry in water, wet-laid technology well known in the art for papers and wet-laid nonwovens can be used. Combinations of dry-laid and wet-laid methods can be used as well to make a porous fibrous sheet according to the present invention. The nanofibers used in this invention can be fibrillated or not.

An aqueous dispersion of nanofibers can be placed on a permeable screen and dewatered in a controlled way to form a high barrier layer. Binders used in papers may be added in the aqueous dispersion of the nanofibers to increase the strength of the resulting high barrier layer. Useful binders may be inorganic or organic. Typical binders are synthetic latex and are based on styrene-butadiene copolymers, polyvinyl acetate, and a variety of acrylic polymers. Other useful binders are disclosed in Koslow U.S. 2003/0177909. Similarly, wood pulp fibers may be blended with the nanofibers (with or without binders) and after removing the water to form a fibrous layer that has improved barrier versus paper of the same basis weight that does not contain nanofibers.

In one embodiment of the present invention, a porous fibrous paper-like sheet is prepared by wet-laying a furnish comprising nanofibers and wood pulp to form a porous paper-like sheet comprising between about 1 weight percent and 99 weight percent nanofibers and between about 99 and 1 weight percent of wood pulp, based on the total combined weight of wood pulp and nanofibers in the fibrous sheet. Fibrous sheets formed in this manner have the nanofibers and wood pulp fibers substantially uniformly distributed throughout the fibrous sheet.

In another embodiment of the present invention, a furnish comprising wood pulp can be wet laid to form a wood pulp layer followed by wet laying a furnish comprising nanofibers directly on the wet-laid wood pulp layer to form a layered porous paper-like sheet comprising between about 1 weight percent and 99 weight percent nanofibers and between about 99 and 1 weight percent of wood pulp, based on the total combined weight of wood pulp and nanofibers in the fibrous sheet. Additional layers can be deposited to form the desired number of layers. In a two-layer sheet, the nanofibers are concentrated on one outer surface of the sheet and the wood pulp fibers are concentrated on the other outer surface of the sheet. When more than two wet-laid layers are used, either a wood pulp layer or a nanofiber layer can form one or both of the outer surfaces of the sheet. Combinations can be made using layers of nanofibers, layers of wood pulp, and layers of nanofiber/wood pulp blends. A specific example would be a "sandwich-type" arrangement with two outer layers of wood pulp and an inner layer of a nanofiber/wood pulp blend, with the blend comprising between about 1 weight percent and 99 weight percent nanofibers and between about 99 and 1 weight percent of wood pulp, based on the total combined weight of wood pulp and nanofibers in the inner layer.

Alternately, a furnish comprising nanofibers can be wet laid on a pre-formed wood pulp-containing paper. Paper grades used in medical packaging vary in fiber density, porosity, various treatments, additives, and basis weight. Medical papers are bleached and highly refined and are made by the traditional wet laid process using virgin wood pulp. The preformed paper preferably has a basis weight of about 1.4 oz/yd$^2$ (49 g/m$^2$) to 2.9 oz/yd$^2$ (98 g/m$^2$). Kraft paper is a particular type of paper often used in medical packaging. It is made from kraft pulp and the method for making it involves cooking (digesting) wood chips in an alkaline solution for several hours during which time the chemicals attack the lignin in the wood. The dissolved lignin is later removed leaving behind the cellulose fibers. Unbleached kraft pulp is dark brown in color, so before it can be used in many paper-making applications it must undergo a series of bleaching processes.

The porous fibrous sheet according to the present invention can be additionally densified after forming to obtain optimum density to balance and optimize sheet porosity, barrier properties, and strength. The densification can be preformed by calendering the sheet in the nip of a hard (metal-metal) calender or a soft calender or by compression in different types of presses (platen press, double belt press, etc). The densification can be performed at room or at an elevated temperature.

The nanofibers are preferably deposited on the wet-laid wood pulp layer or pre-formed paper layer at between about 0.5 g/m$^2$ and 11.g/m$^2$. Preferably, the nanofiber layer is the outer side of a medical package that is printed to identify the package. In this arrangement, possible microbial challenges are intercepted at the outer surface of the package and farther away from the sterilized contents. The opposite layer facing inside the package would be coated with a heat sealing formulation for heat sealing to the film.

The materials described above are especially suited for use in medical packaging. For example, a lidding component comprising the porous fibrous sheet of the present invention can be heat-sealed to a second component of thermoformed film after medical equipment or some other object to be sterilized is placed in a cavity formed from the thermoformed film. A heat seal layer can be extruded or coated onto the areas of the lidding that need to be sealed to the thermoformed film or can be extruded or coated onto the thermoformed film.

Test Methods

In the non-limiting examples that follow, the following test methods were employed to determine various reported characteristics and properties. ASTM refers to the American Society of Testing Materials. TAPPI refers to Technical Association of Pulp and Paper Industry.

Thickness and Basis Weight (Grammage) of papers were determined in accordance with ASTM D 645 and ASTM D 646 correspondingly.

Density (Apparent Density) of papers was determined in accordance with ASTM D 202.

Gurley Air Resistance (Gurley) for papers was determined by measuring air resistance in seconds per 100 milliliters of cylinder displacement for approximately 6.4 square centimeters circular area of a paper using a pressure differential of 1.22 kPa in accordance with TAPPI T 460.

Barrier Log Reduction Value (LRV) and Spore Penetration for papers is a measure of the bacterial barrier properties of a sheet and was determined in accordance with ASTM F 1608. Spore penetration was calculated as the percentage of spores that passed through a paper sample during the test. Higher LRV and lower spore penetration values correspond to higher bacterial barrier properties. LRV and percent spore penetration are calculated based on the specific number of colony forming units used in a specific test. Since this number varies by approximately $1 \times 10^6$, the LRV and percent spore penetration will vary also.

Fiber Length and Length Distribution was determined with Fiber Quality Analyzer Serial Number LDA 96053 produced by OpTest Equipment Inc.

Fiber diameter was measured from scanning electron photomicrographs.

Canadian Standard Freeness (CSF) of the pulp and fibrillated fibers is a measure of the rate at which a dilute suspension of pulp may be drained and was determined in accordance with TAPPI Test Method T 227.

EXAMPLES

In the examples that follow, the fibrillated lyocell fibers were made by fibrillating 1.25 denier staple fibers having a length of 10 mm (available from Tencel, Inc.) in water using a Warner high-speed blender.

Examples 1-3

For Example 1, 4.0 g (based on dry weight) of a water slurry of fibrillated lyocell fiber with CSF of 40, arithmetic mean length of about 0.4 mm and weight weighted mean length of 2.6 mm (diameter of majority of nanofibers is in 200-400 nm range), was placed in a laboratory mixer (British pulp evaluation apparatus) with about 1600 g of water and agitated for 3 min.

The dispersion was poured, with 8 liters of water, into an approximately 21 cm×21 cm handsheet mold to form a wet-laid sheet. The sheet was placed between two pieces of blotting paper, hand couched with a rolling pin and dried in a handsheet dryer at 150° C. The final paper had a basis weight of 98.7 g/m².

A second paper sample formed as described above for Example 1 was additionally passed through the nip of a metal-metal calender with a roll diameter of about 20 cm at a temperature of about 23° C. and linear pressure of about 2600 N/cm to obtain the paper sample of Example 2.

A third paper sample formed as described above for Example 1 was additionally compressed in a platen press at a temperature of about 23° C. and pressure of about 15 MPa for 1 min. By such treatment, the compressed paper sample of Example 3 was produced. Properties of the papers are shown in Table 1 below. Densification of the paper sample by calendering or compression results in an increase in the LRV (increased bacterial barrier) with a concomitant increase in Gurley air resistance (reduced air permeability).

Examples 4-5

For Example 4, 2.0 g (based on dry weight) of the same fibrillated lyocell fiber as in Example 1 and 2.0 g (based on dry weight) of Southern Bleached Hardwood Kraft pulp (from International Paper Company) refined to CSF of 104, were placed together in a laboratory mixer (British pulp evaluation apparatus) with about 1600 g of water and agitated for 3 min.

The solid materials in the slurry were: 50 weight percent fibrillated lyocell fiber and 50 weight percent wood pulp. A wet-laid paper was prepared and dried using the method described in Example 1. The final paper had a basis weight of 92.9 g/m².

A second paper sample formed as described above for Example 4 was additionally calendered as described above for Example 2 to form the calendered paper of Example 5. Properties of the papers are shown in the Table 1 below.

Examples 6-7

Paper samples for Examples 6-7 were prepared and calendered as described above for Example 5, but with varying percentages of the two components (fibrillated lyocell fiber and wood pulp). The percentages of the two components of the paper compositions and the properties of the calendered papers are shown in Table 1 below.

Comparing the properties of the calendered papers of Examples 2 and 5-7, higher levels of lyocell nanofibers result in higher LRV and lower Gurley air resistance.

Examples 8-9

2.0 g (based on dry weight) of fibrillated lyocell fibers with a CSF of 150, arithmetic mean length of about 0.5 mm and weight weighted mean length of 3.8 mm (diameter of majority of nanofibers is in 200-400 nm range), and 2.0 g of the 104 CSF refined bleached hardwood pulp were placed in a laboratory mixer (British pulp evaluation apparatus) with about 1600 g of water and agitated for 3 min.

The dispersion was poured, with 8 liters of water, into an approximately 21 cm×21 cm handsheet mold to form a wet-laid sheet. The sheet was placed between two pieces of blotting paper, hand couched with a rolling pin and dried in a handsheet dryer at 150° C.

The dried paper was calendered as described above for Example 2 to obtain the calendered paper of Example 8.

A second paper sample was prepared as described for Example 8, except instead of calendering, the as-formed dried paper was compressed as described above for Example 3 to obtain the compressed paper of Example 9.

Properties of the papers are shown in Table 1 below.

Example 10

2.00 g (based on dry weight) of the same fibrillated lyocell fiber as in Example 1 and 2.00 g (based on dry weight) of bleached hardwood pulp refined to CSF of 254, were placed together in a laboratory mixer (British pulp evaluation apparatus) with about 1600 g of water and agitated for 3 min. The solid materials in the slurry were: 50 weight percent fibrillated lyocell fiber and 50 weight percent wood pulp.

The dispersion was poured, with 8 liters of water, into an approximately 21 cm×21 cm handsheet mold to form a wet-laid sheet. The sheet was placed between two pieces of blotting paper, hand couched with a rolling pin and dried in a handsheet dryer at 150° C.

The dried paper was calendered as described above for Example 2 to obtain the calendered paper of Example 10. Properties of the paper are shown in Table 1 below.

Example 11

2.00 g (based on dry weight) of the same fibrillated lyocell fiber as in Example 1 and 2.00 g (based on dry weight) of bleached hardwood pulp refined to CSF of 254 were placed together in a laboratory mixer (British pulp evaluation apparatus) with about 1600 g of water and agitated for 3 min. After that, 0.40 g (based on dry weight) of polyvinyl acetate dispersion Type DF 51/10 (available from AB Achema) was added and agitating was continued for an additional 3 min. The solid materials in the final slurry were: 45.45 weight percent fibrillated lyocell fiber, 45.45 weight percent wood pulp, and 9.1 weight percent polyvinyl acetate binder.

A wet-laid paper was prepared and dried using the method described in Example 1. The polyvinyl acetate binder was activated in the dryer. The dried paper was then calendered as described above for Example 2 to obtain the calendered paper of Example 11. Properties of the paper are shown in Table 1 below.

Example 12-13

2.00 g (based on dry weight) of the same fibrillated lyocell fiber as in Example 1 was placed in a laboratory mixer (British pulp evaluation apparatus) with totally of about 1600 g of water and agitated for 3 min.

The dispersion was poured, with 8 liters of water, into an approximately 21 cm×21 cm handsheet mold to form a wet-laid sheet.

2.00 g (based on dry weight) of bleached hardwood pulp refined to CSF of 104 was placed in a laboratory mixer (British pulp evaluation apparatus) with about 1600 g of water and agitated for 3 min.

The dispersion was poured, with 8 liters of water, into an approximately 21 cm×21 cm handsheet mold to form a second wet-laid sheet.

Both handsheets were placed together in the wet form face-to-face between two pieces of blotting paper, hand couched with a rolling pin and dried in a handsheet dryer at 150° C.

The dried 2-ply paper was calendered as described above for Example 2 to obtain the 2-ply calendered sheet of Example 12.

A second 2-ply paper was prepared as described for Example 12, except that instead of calendering the dried paper, it was compressed as described above for Example 3 to obtain the compressed 2-ply paper of Example 13

Properties of the paper are shown in Table 1 below. Comparing Example 12 (calendered 50/50 nanofiber/wood pulp layered) to Example 5 (calendered 50/50 nanofiber/wood pulp blend), the LRV of the layered paper is slightly lower than that of the blend paper and both have LRV's that are significantly higher than conventional medical papers.

Examples 14-15

Electroblown continuous Nylon 6,6 nanofibers were prepared according to PCT International Publication Number WO 03/080905 to Kim et al. followed by placing with water in a Warner high-speed blender and agitating to reduce the fiber length and to disperse the fibers in water. The final nanofibers had an average diameter of about 500 nm (diameter range is from about 300 to about 700 nm), arithmetic mean length of about 0.19 mm and weight weighted mean length of about 0.66 mm. 2.00 g (based on dry weight) of the nanofibers and 2.00 g (based on dry weight) of bleached hardwood pulp refined to CSF of 254, were placed together in a laboratory mixer (British pulp evaluation apparatus) with about 1600 g of water and agitated for 3 min. The solid materials in the slurry were: 50 weight percent nylon nanofibers and 50 weight percent wood pulp.

A wet-laid paper was prepared and dried using the method described in Example 1. The dried paper was then calendered as described above for Example 2 to obtain the calendered paper of Example 14.

A second paper was prepared as described for Example 14 except that instead of calendering the dried paper, it was compressed as described above for Example 3 to obtain the compressed paper of Example 15.

Comparative Examples A and B

Comparative Examples A and B are commercially available wood-pulp based medical papers. Comparative Example A is 45# Impervon® medical paper and Comparative Example B is 60# Impervon® medical paper, both available from Kimberly-Clark Corporation.

Properties of the papers are shown in Table 1 below. All of the paper samples of the present invention have significantly higher LRV's than those of the commercial medical papers. By varying the percentage of nanofibers in the paper as well as the degree of densification, it is possible to achieve a wide range of Gurley Hill air resistance so that the paper properties can be tailored to meet the requirements of various sterilization processes used in the art.

TABLE 1

Paper Properties

| | Paper composition (wt. %) | | | | | | | | | | | Spore | |
| --- | --- | --- | --- | --- | --- | --- | --- | --- | --- | --- | --- | --- | --- |
| Example | Lyocell nanofibers 40 CSF | Lyocell nanofibers 150 CSF | Nylon 6,6 nanofibers 500 nm | Wood pulp 104 CSF | Wood pulp 254 CSF | PVAc | Condition** | Basis wt. (g/m$^2$) | Thickness (mm) | Density (g/cm3) | LRV | Penetration (%) | Gurley (sec) |
| 1 | 100 | | | | | | | 98.7 | 0.416 | 0.24 | 5.9 | 0.0002 | 6.9 |
| 2 | 100 | | | | | | C | 98.3 | 0.110 | 0.90 | 6.4 | 0.0000 | 49 |
| 3 | 100 | | | | | | P | 97.9 | 0.221 | 0.44 | 6.4 | 0.0000 | 19 |
| 4 | 50 | | | 50 | | | | 92.9 | 0.288 | 0.32 | 6.4 | 0.0000 | 17 |
| 5 | 50 | | | 50 | | | C | 94.4 | 0.106 | 0.90 | 6.0 | 0.0000 | 103 |
| 6 | 10 | | | 90 | | | C | 99.2 | 0.108 | 0.92 | 5.5 | 0.0001 | 174 |

TABLE 1-continued

Paper Properties

| | Paper composition (wt. %) | | | | | | | | | | Spore | |
| --- | --- | --- | --- | --- | --- | --- | --- | --- | --- | --- | --- | --- |
| Example | Lyocell nanofibers 40 CSF | Lyocell nanofibers 150 CSF | Nylon 6,6 nanofibers 500 nm | Wood pulp 104 CSF | Wood pulp 254 CSF | PVAc | Condition** | Basis wt. (g/m²) | Thickness (mm) | Density (g/cm3) | LRV | Penetration (%) | Gurley (sec) |
| 7 | 1 | | | 99 | | | C | 95.2 | 0.100 | 0.95 | 5.5 | 0.0005 | 118 |
| 8 | | 50 | | 50 | | | C | 93.3 | 0.112 | 0.84 | 5.8 | 0.0001 | 51 |
| 9 | | 50 | | 50 | | | P | 89.9 | 0.201 | 0.45 | 6.2 | 0.0001 | 21 |
| 10 | 50 | | | 50 | | | C | 94.6 | 0.106 | 0.90 | 6.4 | 0.0000 | 62 |
| 11 | 45.45 | | | | 45.45 | 9.1 | C | 96.2 | 0.112 | 0.86 | 5.9 | 0.0001 | 56 |
| 12* | 50 | | | 50 | | | C | 93.3 | 0.102 | 0.91 | 5.7 | 0.0002 | 116 |
| 13* | 50 | | | 50 | | | P | 93.5 | 0.206 | 0.45 | 5.8 | 0.0001 | 33 |
| 14 | | | 50 | 50 | | | C | 90.8 | 0.128 | 0.71 | 5.5 | 0.0004 | 29 |
| 15 | | | 50 | 50 | | | P | 90.8 | 0.207 | 0.44 | 6.1 | 0.0001 | 6.4 |
| Comp A | | | MEDICAL PAPER | | | | | 78.7 | 0.086 | 0.92 | 1.7 | 2.0159 | 86 |
| Comp B | | | MEDICAL PAPER | | | | | 99.4 | 0.124 | 0.80 | 3.4 | 0.0327 | 17 |

*2-ply paper
**Condition - C means calendered and P means compressed by a platen.

What is claimed is:

1. A porous fibrous sheet comprising at least two outer layers of wet-laid wood pulp and an inner layer of a fibrillated nanofiber/wood pulp blend sandwiched between the two outer layers, wherein the blend comprises between about 1 weight percent and 99 weight percent fibrillated nanofibers and between about 99 and 1 weight percent wood pulp, based on the total combined weight of fibrillated nanofibers and wood pulp in the blend.

2. The sheet of claim 1, wherein the fibrillated nanofibers are lyocell.

3. A medical package comprising a lidding component heat-sealed to a second component, wherein the lidding component comprises the fibrous sheet of either of claim 1, wherein the fibrous sheet has an LRV of at least 1.

4. The medical package of claim 3, wherein the fibrous sheet has an LRV of at least 3.

5. The medical package of claim 3, wherein the fibrous sheet has an LRV of at least 5.5.

6. The medical package of claim 3, wherein the fibrous sheet has a maximum spore penetration of 0.0005%.

* * * * *